US012812418B2

(12) United States Patent
Lien et al.

(10) Patent No.: US 12,812,418 B2
(45) Date of Patent: Nov. 24, 2026

(54) PROXY SYSTEM FOR TESTING WIRELESS DEVICES IN A TELECOMMUNICATIONS NETWORK

(71) Applicant: T-Mobile Innovations LLC, Overland Park, KS (US)

(72) Inventors: Frederick Lien, Bellevue, WA (US); Prakasa Bellam, Snohomish, WA (US); Chifu Huang, Seattle, WA (US); Ji Yeon Lee, Bellevue, WA (US); Koichi Osada, Renton, WA (US); Sumeet Prakash, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 262 days.

(21) Appl. No.: 18/602,586

(22) Filed: Mar. 12, 2024

(65) Prior Publication Data

US 2025/0294382 A1 Sep. 18, 2025

(51) Int. Cl.
*H04W 24/06* (2009.01)
*H04W 12/80* (2021.01)
*H04W 80/06* (2009.01)

(52) U.S. Cl.
CPC ........... *H04W 24/06* (2013.01); *H04W 12/80* (2021.01); *H04W 80/06* (2013.01)

(58) Field of Classification Search
CPC ...... H04W 24/06; H04W 12/80; H04W 80/06
See application file for complete search history.

(56) References Cited

U.S. PATENT DOCUMENTS

| | | | | |
|---|---|---|---|---|
| 9,331,890 | B1 | 5/2016 | Fallows et al. | |
| 9,350,763 | B1 | 5/2016 | McHugh et al. | |
| 2014/0237585 | A1* | 8/2014 | Khan .................. | H04L 63/0272 726/15 |
| 2016/0173537 | A1* | 6/2016 | Kumar .................. | H04L 67/141 709/228 |
| 2017/0214703 | A1* | 7/2017 | Tekchandani ....... | H04L 63/1425 |
| 2020/0106696 | A1* | 4/2020 | Michael .................. | H04L 45/24 |
| 2024/0129741 | A1* | 4/2024 | Tung .................. | H04L 63/1425 |

* cited by examiner

*Primary Examiner* — Steven Hieu D Nguyen
(74) *Attorney, Agent, or Firm* — Jones Burke, PLLC

(57) ABSTRACT

Systems and methods are provided for simulating error conditions between a wireless device and a live cellular network. A communications protocol proxy system intercepts, monitors, and modifies the two-way interactive TCP notification traffic between the wireless device and live cellular network without modifications to the live cellular network. Data packets being communicated between the wireless device and the live cellular wireless communication network are analyzed at the communications protocol proxy to determine if a test scenario is applicable to the data packets. The data packets are modified according to the test scenario to simulate an error in communication between the wireless device and live cellular network.

20 Claims, 4 Drawing Sheets

PROXY SYSTEM FOR TESTING WIRELESS DEVICES IN A TELECOMMUNICATIONS NETWORK

TECHNICAL BACKGROUND

As communication networks evolve and grow, there are ongoing challenges in communicating data across different types of networks. Different types of networks can include wireless communication networks, packet-switched networks such as the internet, satellite networks, public/private networks, local area networks (LANs), wide area networks (WANs), and any network enabling communication between wireless devices. Other types of communication networks in various combinations may be envisioned by those having ordinary skill in the art in light of this disclosure. One type of communication network described herein includes telecommunications networks, such as 5G New Radio (NR) networks, 4G LTE networks, etc. Such networks utilize specialized devices, such as gateways, routers, switches, etc. that enable communication between sub-network types, such as radio access networks (RANs), core networks, and so on, as further described herein. Further, data in the order of billions of packets per second traverse modern networks, thus requiring robust packet processing mechanisms.

To minimize disruptions in the networks, testing of wireless devices is performed on standalone platforms. The standalone platforms test software modules on a wireless device. The standalone testing platforms do not test the wireless device while connected to a working wireless communication network. These platforms do not allow simulation of network failures in a working wireless communication network and cannot simulate multiple kinds of network failures in a reproducible way and recreate those errors for multiple wireless devices.

Overview

Exemplary embodiments described herein include methods and systems for simulating error conditions between a wireless device and a wireless telecommunications network. Two-way interactive TCP channel traffic, such as WebSocket traffic, is routed between a wireless device and wireless communication network through a communications protocol proxy. Error conditions are simulated between the wireless device and the wireless communication network using the communications protocol proxy.

In one example, data packets being communicated between the wireless device and the wireless communication network are intercepted at the communications protocol proxy. The data packets are analyzed to determine if a test scenario is applicable. The data packets are modified to simulate an error in communication between the wireless device and the wireless communication network.

In one example, the communications protocol proxy is a WebSocket protocol proxy, and the wireless communication network is a live cellular network. Phone calls and text messages are passed through the WebSocket proxy such that the traffic passes freely back and forth between the wireless device and the live cellular network.

A processing node with a processor and a memory for storing logic that is executed by the processor to perform operations is provided. Data packets being communicated between the wireless device and the wireless communication network are intercepted at a WebSocket proxy. An operation analyzes the data packets to determine if a test scenario is applicable to the data packets. An operation modifies the data packets to simulate an error in communication between the wireless device and the wireless communication network according to the test scenario.

DETAILED DESCRIPTION

Figure 1:
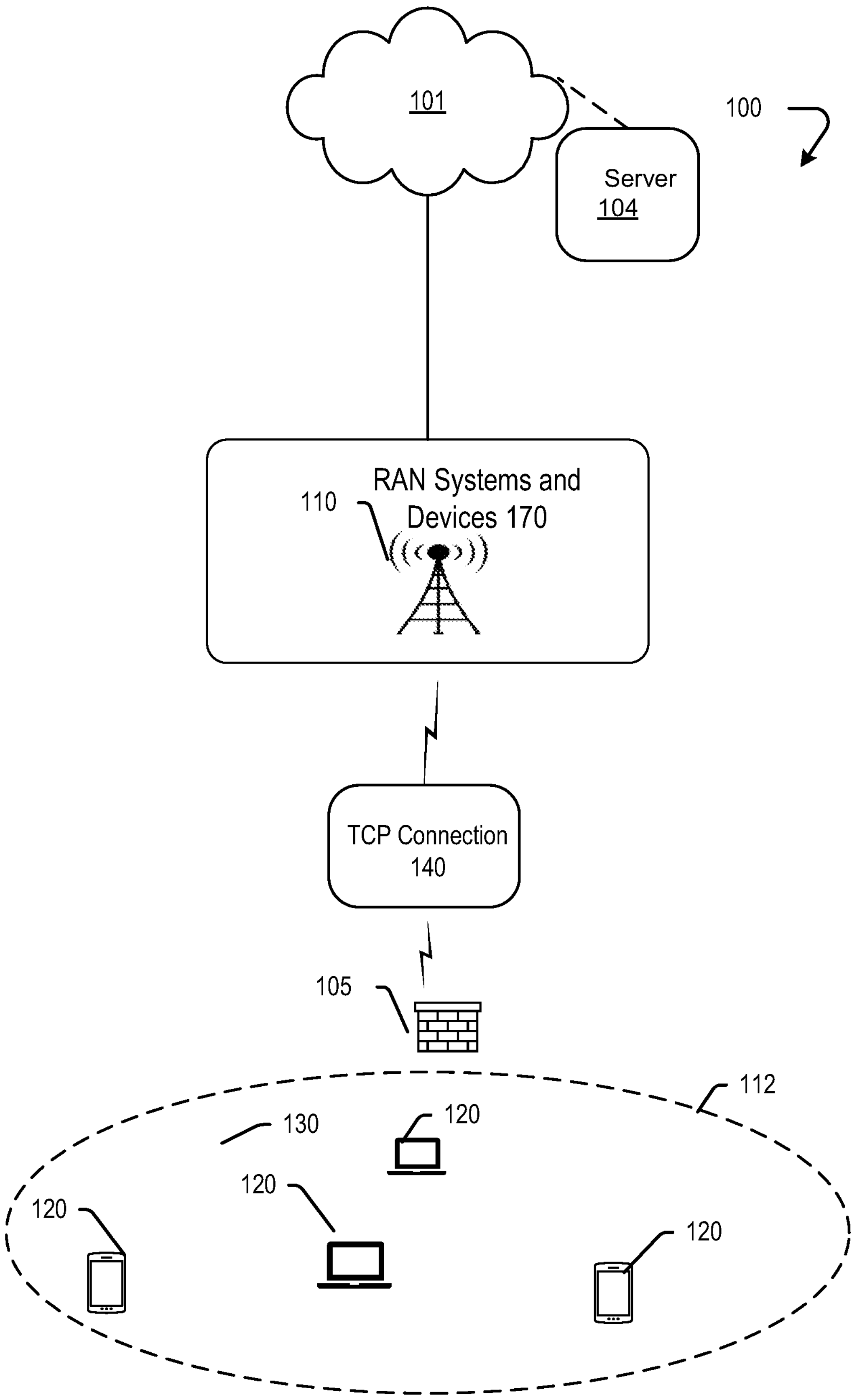
FIG. 1 depicts a telecommunications environment in accordance with various aspects of the present disclosure.

In the following description, numerous details are set forth, such as flowcharts, schematics, and system configurations. It will be readily apparent to one skilled in the art that these specific details are merely exemplary and not intended to limit the scope of this application.

Historically, testing of wireless devices is performed on standalone platforms. The standalone platforms test software modules on the wireless device. The standalone testing platforms do not test the wireless device while connected to a working wireless communication network. The standalone platforms are not designed to test wireless device recovery capability when operating in a working wireless communication network.

In accordance with various aspects of the present disclosure, a communications protocol proxy system is provided to simulate multiple kinds of network failures in a reproducible way and recreate those errors for multiple wireless devices. The communications protocol proxy system is between the wireless device, such as a cell phone, and a wireless communication network, such as a cellular network. The communications protocol proxy system dynamically modifies the traffic to and from the wireless device and returns stored mocked responses. Testing can be conducted without modification to either the wireless device or wireless communication network.

In examples, the communications protocol proxy system supplements a WebSocket notification channel between the wireless device and the wireless communication network with an intermediate proxy WebSocket to create a testing WebSocket connection to the upstream cellular wireless communication network. The communications protocol proxy system can transparently intercept, monitor, and modify the WebSocket notification channel traffic between the wireless device and the wireless communication network.

The communications protocol proxy system establishes an intermediate node in the wireless communication network that acts as a communication protocol proxy. The wireless device is configured to point to a communications protocol proxyport of the communication protocol proxy, and from then on, all traffic is sent normally and is transparently passed through the communications protocol proxy. The wireless device logs into the wireless communication network and passes login messaging through the communications protocol proxy. The communications protocol proxy sends the packets to the wireless communication network like a conventional gateway or router. To the wireless communication network it appears the wireless device is logging in normally over the network and the network is unaware that the traffic is travelling through the communications protocol proxy.

Once the communications protocol proxy connection is established, it acts as a transparent pipeline between the wireless device and the wireless communication network infrastructure allowing phone call and text message traffic to pass freely back and forth. The communications protocol proxy may selectively modify messages that pass between the wireless device and the wireless communication network to simulate different error conditions in a predictable and reproducible way.

Errors in the wireless communication network are identified by a specific network message. The specific network message may be a pre-recorded message with a known error or a dynamic modification of a packet using a set of prepared rules. The dynamic modifications may be simple string replacements, or more complex rules defined using regular expressions. The errors are captured by the communications protocol proxy and reported to the communications protocol proxy system for evaluation.

The communications protocol proxy system may utilize a socket watcher component to tap into the communications protocol proxy connection to intercept and modify these requests. The communications protocol proxy connection between the wireless device and wireless communication network may also be utilized to send unanticipated (asynchronous) messages to the wireless device, such as incoming call requests and incoming text messages.

The communications protocol proxy system allows testing the behavior of a wireless device when confronted with an error message. The communications protocol proxy system may also build multiple event tests, such as receiving an error message, retrying, receiving another error message, retrying, and finally receiving a success message.

The communications protocol proxy system works with existing off the shelf wireless devices and existing, unmodified wireless communication networks. Without any additional modifications to the production environment, the communications protocol proxy system sits in between and simulates various types of network failures.

FIG. 1 depicts an exemplary telecommunications environment in accordance with the disclosed embodiments. The environment 100 may include a communication network 101, and a radio access network (RAN) 170, including at least one access node 110. The RAN 170 may include other devices and additional access nodes.

The environment 100 also includes multiple wireless devices 120 which may be end-user wireless devices such as smart phones and may operate within one or more coverage areas 112. The wireless devices 120 in the coverage area 112 communicate with the RAN 170 over a communication link, which may for example be a 5G NR and/or 4G LTE communication link.

Access node 110 deploys one or more wireless air interfaces to which wireless devices 120 can attach and access network services from a network, such as network 101. For example, access node 110 can include any standard access node such as a macro-cell access node, base transceiver station, a radio base station, an eNodeB device, an enhanced eNodeB device, a next generation NodeB device (gNodeB) in 5G networks, or the like. Alternatively, access node 110 may comprise any short range, low power, small-cell access node such as a microcell access node, a picocell access node, a femtocell access node, or a home eNodeB/gNodeB device.

Further, wireless devices 120 may be any device, system, combination of devices, or other such communication platform capable of communicating wirelessly with access node 110 using one or more frequency bands deployed therefrom. Wireless device 120 may be, for example, a mobile phone, a wireless phone, a cellular phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. Communication network 101 can be wired and/or wireless communication networks, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 120. Wireless communication network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE) and 6G.

Other network elements may be present in environment 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements. Further, the methods, systems, devices, networks, access nodes, and equipment described herein may be implemented with, contain, or be executed by one or more computer systems and/or processing nodes. The methods described above may also be stored on a non-transitory computer readable medium. Many of the elements of environment 100 may be, comprise, or include computers systems and/or processing nodes.

TCP connection 140 is two-way interactive communication between a wireless device and a server 104 of network 101. Transmission Control Protocol (TCP) defines how to establish and maintain a network conversation by which applications can exchange data. TCP resides at the transport layer of the Open Systems Interconnection (OSI) model. In one example, the TCP connection 140 is a WebSocket channel.

Server 104 may be a WebSocket server. WebSocket is a computer communications protocol, providing simultaneous two-way communication channels over a single TCP connection. WebSocket is designed to work over HTTP ports 443 and 80 as well as to support HTTP proxies and intermediaries, making it compatible with HTTP. TCP connection 140, such as a WebSocket connection, is beneficial for environments that block non-web Internet connections using firewall 105.

Firewall 105 monitors incoming and outgoing network traffic and decides whether to allow or block specific traffic between wireless device 120 and communication network 101 based on a defined set of security rules. Wireless device 120 registers with communication network 101 by sending messages that are defined using a communication protocol, such as http, to permit traffic.

Figure 2:
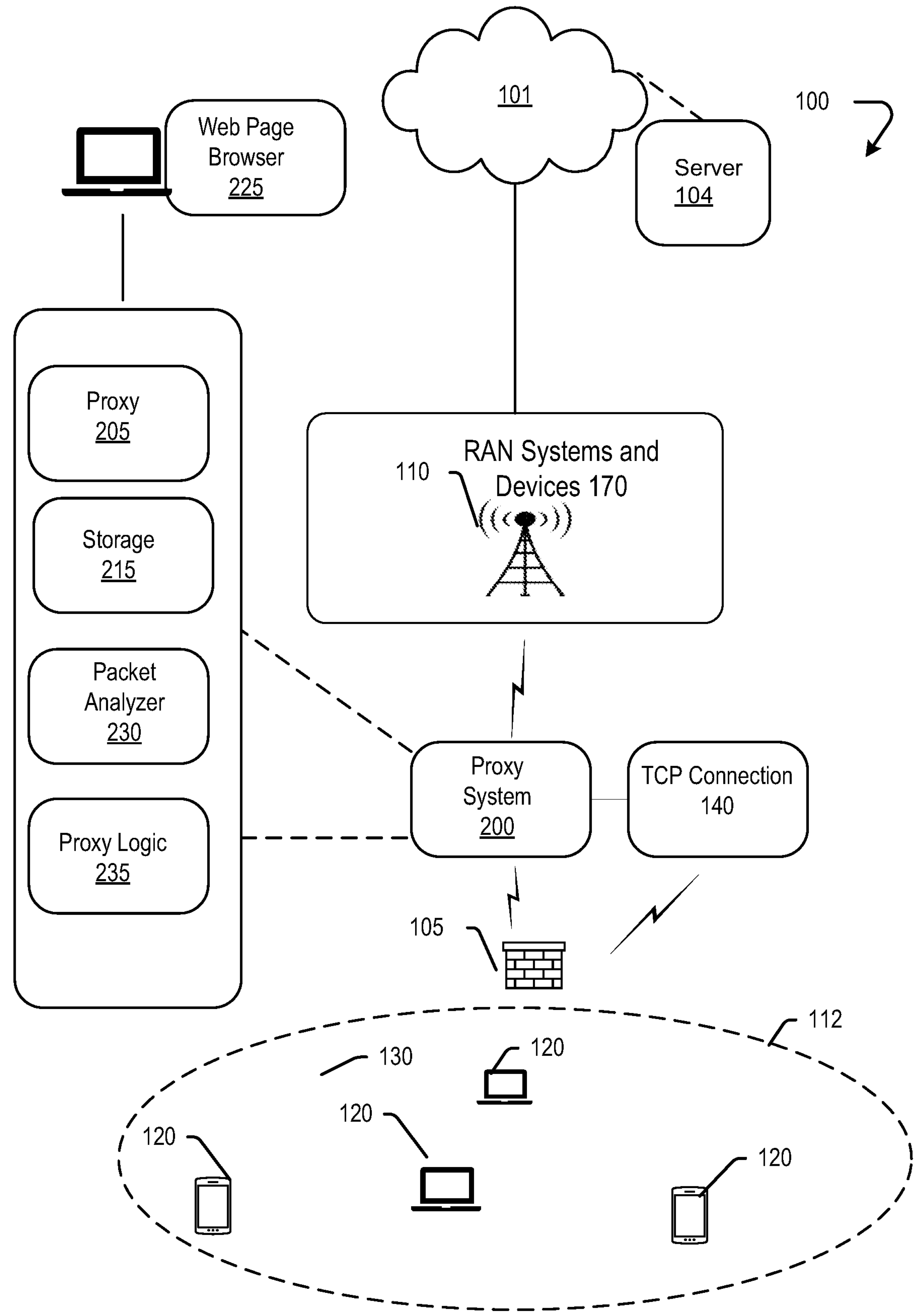
FIG. 2 depicts a telecommunications testing environment with communications protocol proxy system in accordance with various aspects of the present disclosure.

FIG. 2 depicts an exemplary communications environment with communications protocol proxy system 200 in accordance with the disclosed embodiments. Communications protocol proxy system 200 is shown as communicating with the network 101. However, it should be noted that this configuration is merely exemplary and that these components may be in other locations. Further, the communications protocol proxy system 200 may be distributed. For example, the communications protocol proxy system 200 may utilize components in the communication network 101 or the RAN 170. Alternatively, the communications protocol proxy system 200 may be an entirely discrete component, such as a processing node.

In a typical deployment, communications protocol proxy system 200 includes proxy 205, storage 215, web page browser 225, packet analyzer 230, proxy logic 235. Proxy 205, storage 215, web page browser 225, packet analyzer 230, proxy logic 235 may be loaded and launched at the same time and maintain consistent internal states of the tests and communication.

Communications protocol proxy system 200 provides a unique testing experience for wireless devices 120. Traffic between a wireless device, such as one of the wireless devices 120, and network 101 is transparently transmitted such that a specific test scenario, such as a target packet, may be observed. The test scenario, such as a target packet, may be modified in real-time, allowing the test personnel to observe wireless device error recovery behavior in a live network 101, without modifying the wireless device or network 101 code. A live network 101 is a network that is currently providing real-time wireless communication services to its subscribing wireless devices, such as the wireless device.

Typically, the network 101 is operated by mobile network operator (MNO). In examples, network 101 is a live cellular network. The real-time services include voice and data transfer over a wireless communication network, which is made up of a network of cell sites spread out across a geographic area. Performing test scenarios in a live cellular network provides a real-time representation of the wireless communication network 101 and a repeatable test environment to allow the recreation of intermittent network errors and/or intermittent service errors, with minimal impact to the wireless devices 120 and network 101.

Web page browser 225 may be a web page downloaded to the browser of a testing device. Webpage browser 225 maintains TCP connections with server 104 so that a testing device can identify and monitor traffic between a wireless device (e.g., one of the wireless devices 120) and communication network 101. Web page browser 225 allows test scenarios to be selected from proxy logic 235 maintained in storage 215. Proxy logic 235 includes a set of test scenarios that may be run on command. Selected tests are activated at web page browser 225. Additionally, web page browser 225 communicates the results of the modified wireless device traffic to a testing device.

In one example, a test personnel dashboard from web page browser 225 may be accessed via HTTPS running over port 443. The communications protocol proxy 205 utilizes port 3443. An A-10 performs SSL offloading of the 443 port and transfers requests to a communications protocol proxy application control layer over TCP. Proxy traffic from the wireless device is transferred to port 3443 without SSL offloading, and is decrypted by communications protocol proxy system 200, which may re-encrypt the traffic before sending to network 101.

Packet analyzer 230 monitors traffic, such as requests from wireless device 120 and corresponding responses from network 101. Packet analyzer 230 monitors or listens for data packets communicated through communications protocol proxy 205. A packet analyzer 230 analyzes and logs data packets passed back and forth between the wireless device and the wireless communication network 101. As data streams flow through proxy 205, packet analyzer 230 captures data packets and, if needed, decodes the packet's raw data, showing the values of various fields in the packet, and analyzes its content.

When a particular data packet is identified, rules for a test scenario are applied to see if the packet contains specific data. Each test scenario may include one or more rules that recognize a particular data packet being passed between wireless device 120 and wireless communication network 101. When that data is found in the packet, the packet is modified as defined in proxy logic 235. Proxy logic 235 may have multiple sets of rule definitions for multiple test scenarios. Proxy logic 235 is maintained in storage 215. Storage 215 may be a backend database.

Packet analyzer 230 monitors traffic, such as responses from network 101. In one example, packet analyzer 230 receives data packets from responses from network 101. Proxy logic 235 is applied to the data packets of the response and it is determined whether there is an active test scenario that pertains to the response. If there is a related test scenario active, modification rules from proxy logic 235 are applied to the response. The modified response is then sent back to wireless device.

The proxy logic 235 selectively modifies messages that pass between the wireless device and the wireless communication network to simulate different error conditions in a predictable and reproducible way. Errors in the wireless communication network are identified by a specific network message by packet analyzer 230. The specific network message may be a pre-recorded message with a known error or a dynamic modification of a packet using a set of prepared rules. The dynamic modifications may be simple string replacements, or more complex rules defined using regular expressions.

In one example, packet analyzer 230 receives data packets from requests originating at the wireless device. Proxy logic 235 is applied to the data packets of the request and determines whether there is an active test scenario that pertains to the request. If there is a related test scenario active, modification rules from proxy logic 235 are applied to the request. The modified request is then sent to communication network 101.

Data packets for responses may be modified to capture an error message from the server 104 and use the error response as a template to set up additional test scenarios in proxy logic 235. The test scenarios may test the resilience of communications between wireless device 120 and network 101 with multiple error messages before receiving a successful response.

A wireless device connection of the wireless device to the communications protocol proxy system 200 may be established multiple ways. A proxy connection, such as a proxy WebSocket connection, may be established by communications protocol proxy system 200. In one example, proxy connection is established for browser based wireless devices. The wireless device is prompted to perform a "connection close." Once the connection is closed, the wireless device is prompted to reopen the connection, such as a WebSocket.

A re-open request from the wireless device is intercepted by the communications protocol proxy 205. The communications protocol proxy 205 establishes the connection back to the wireless device and maintains its two-way connection through the TCP connection 140. The communications protocol proxy 205 of communications protocol proxy system 200 then uses the name of TCP connection 140, such as a WebSocket, which was passed in the open request, and sends a connection open request to the upstream server 104 in the network 101. In one example, the WebSocket open request is a session border control for a WebRTC Gateway (WRG). WebRTC gateway is a special-purpose device that bridges conventional IP communications networks with the open ecosystem of the Internet. The WRG will then send messages to the wireless device, and they will be intercepted by the communications protocol proxy 205 of communications protocol proxy system 200, which will in turn forward the requests and responses on to wireless device and vice-versa.

In another example, connection to the communications protocol proxy system 200 is established by having the wireless device point to the communications protocol proxy 205 and reregistering the wireless device. The wireless device breaks its registration with network 101 and reregisters with network 101 when airplane mode is switched off and then on.

As part of the reregistration process, the wireless device sends a getNotificationChannel request, for a new WebSocket address. Communications protocol proxy system 200 intercepts the new WebSocket address and saves the new WebSocket address. Communications protocol proxy system 200 replaces the new WebSocket address with the WebSocket address of communications protocol proxy 205 in the response message. When the wireless device receives the response message, it opens the WebSocket, unaware that it is opening a WebSocket that points to the communications protocol proxy 205. As the new WebSocket address has been saved by the communications protocol proxy system 200, the communications protocol proxy system opens the notification channel with the new WebSocket address for the wireless device in WebRTC Gateway (WRG) for communications with the network 101.

These two examples establish a connection between the wireless device and network 101 with the communications protocol proxy 205 as an intermediary. At this point, test scenarios can be applied to traffic between the wireless device and network 101. Traffic through communications protocol proxy 205 does not vary from the typical network traffic.

Figure 3:
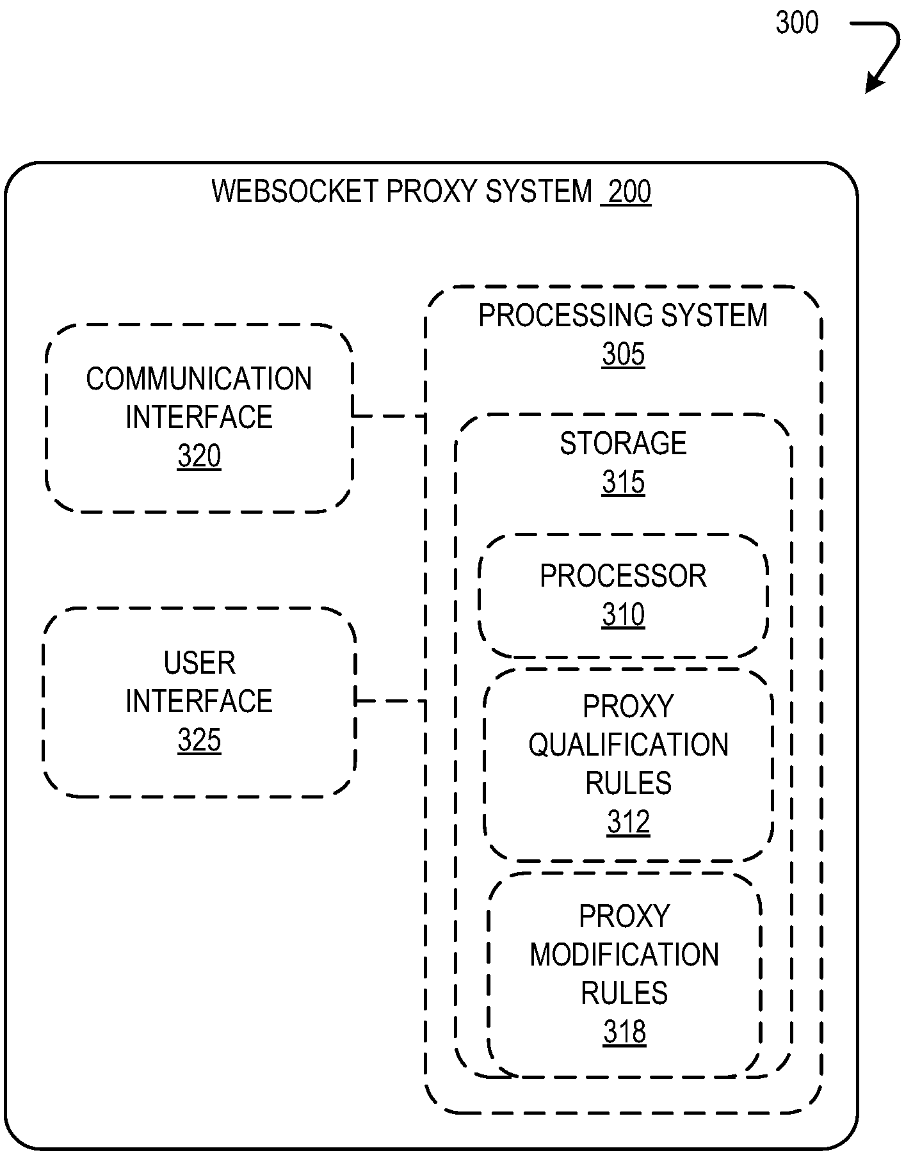
FIG. 3 depicts a communications protocol proxy system in accordance with various aspects of the present disclosure.

FIG. 3 depicts an exemplary processing node 300, which may be configured to perform the methods and operations disclosed herein to establish a two-way interactive communications channel and simulate errors in a network. The processing node 300 includes a communication interface 320, user interface 325, and processing system 305 in communication with communication interface 320 and user interface 325. Processing system 305 includes a processor 310, storage 315, which can comprise a disk drive, flash drive, memory circuitry, or other memory device including, for example, a buffer. Storage 315 can store software which is used in the operation of the processing node 300. Software may include computer programs, firmware, or some other form of machine-readable instructions, including an operating system, utilities, drivers, network interfaces, applications, or some other type of software. Processing system 305 may include a processor 310 and other circuitry to retrieve and execute software from storage 315. Processing node 300 may further include other components such as a power management unit, a control interface unit, etc., which are omitted for clarity. Communication interface 320 permits processing node 300 to communicate with other network elements. User interface 325 permits the configuration and control of the operation of processing node 300.

In an exemplary embodiment, software can include instructions for monitoring traffic through a communications protocol proxy. The instructions may further include proxy logic, such as proxy qualification rules 312 and proxy modification rules 318.

Proxy qualification rules 312 are applied to data packets of communications between the wireless device and network. It is determined whether there is an active test scenario that pertains to the data packets. If there is a related test scenario active, proxy modification rules 318 are applied to the data packets.

The proxy modification rules 318 modify messages that pass between the wireless device and the wireless communication network to simulate different error conditions in a predictable and reproducible way. Proxy modification rules 318 may provide a pre-recorded message with a known error or a dynamic modification of a packet using a set of prepared rules. The dynamic modifications may be simple string replacements, or more complex rules defined using regular expressions.

Figure 4:
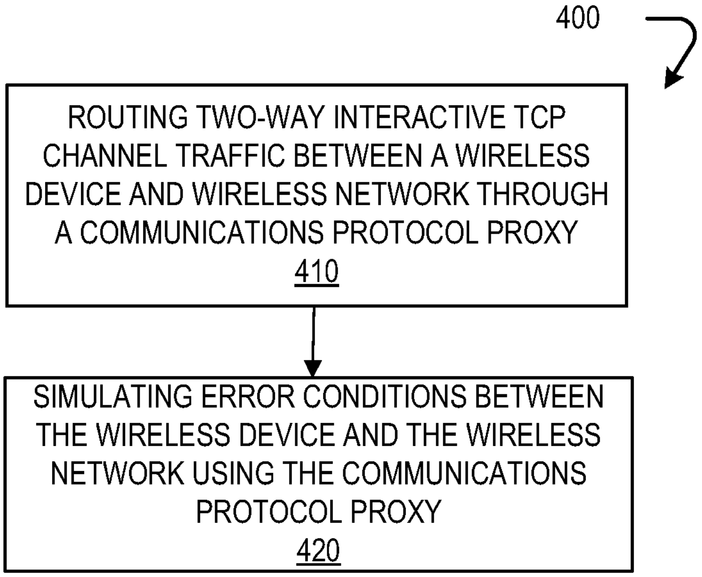
FIG. 4 depicts a method for simulating error conditions in a live telecommunications network in accordance with various aspects of the present disclosure.

FIG. 4 depicts a method for simulating errors in a wireless communication network. The method 400 of FIG. 4 may be implemented by a processing node communicatively coupled to one or more routing nodes, controller nodes, or any other network node. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 410, two-way interactive TCP channel traffic is between a wireless device and wireless communication network is routed through a communications protocol proxy. An intermediate node is established in the wireless communication network that acts as a proxy. A wireless device is configured to point to the communications protocol proxy, and from then on, all traffic is sent normally and is transparently passed through the communications protocol proxy.

At 420, error conditions between a wireless device and a wireless communication network are simulated using the communications protocol proxy. The communications protocol proxy resides between a wireless device and wireless communication network and simulates various types of network failures. The communications protocol proxy allows testing the behavior of a wireless device and/or wireless communication network when confronted with an error message. The communications protocol proxy may simulate multiple test scenarios and error conditions. The data packets communicated between the wireless device and wireless communication network may be modified to simulate errors in the network. The multiple test scenarios may simulate errors and monitor the results when a wireless device receives an error message or multiple error messages. The test scenarios may simulate retrying to re-connect to the wireless communication network, receiving another error message, retrying, and finally receiving a success message. The results of these simulated errors may be sent to a testing device for analysis.

Figure 5:
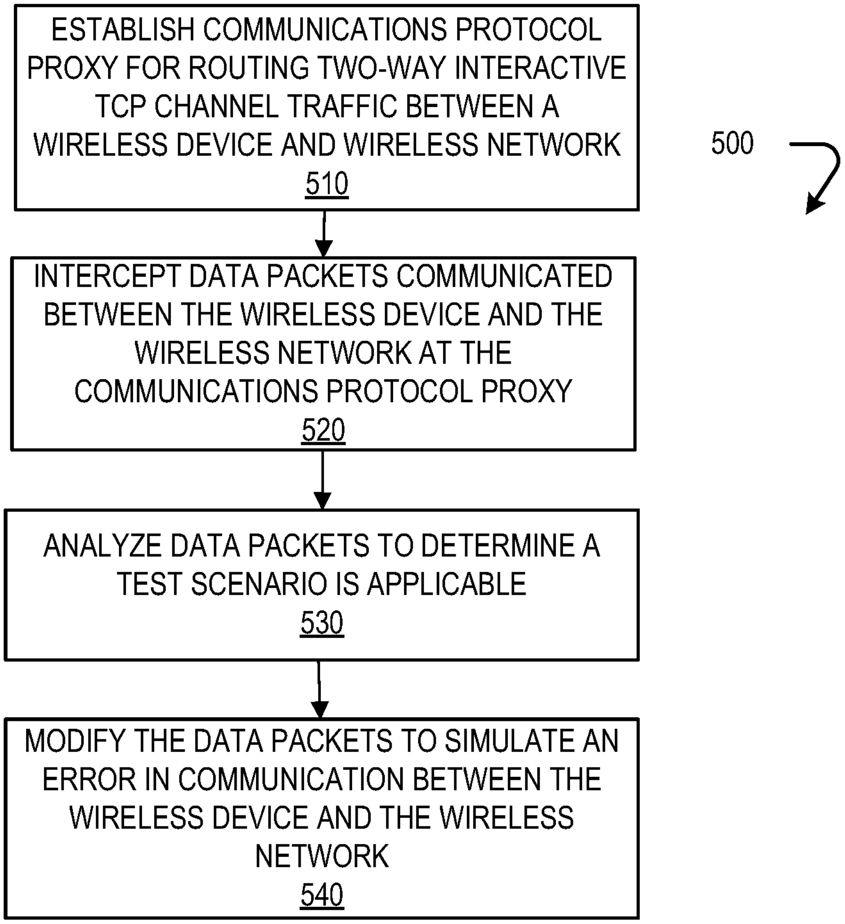
FIG. 5 depicts a method for modifying data to simulate conditions in accordance with various aspects of the present disclosure.

FIG. 5 depicts a method for modifying the data packets to simulate an error in communication between the wireless device and the wireless communication network. The method 500 of FIG. 5 may be implemented by a processing node communicatively coupled to one or more routing nodes, controller nodes, or any other network node. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 510, a communications protocol proxy is established for routing two-way interactive TCP channel traffic between a wireless device and wireless communication network. The wireless device logs into the wireless communication network and passes messaging through the communications protocol proxy, such as a proxy WebSocket. The communications protocol proxy sends the packets to the wireless communication network like a conventional gateway or router. To the wireless communication network it appears the wireless device is logging in normally over the network and the network is unaware that the traffic is travelling through the communications protocol proxy.

At 520, data packets communicated between the wireless device and the wireless communication network are intercepted at the communications protocol proxy. A packet analyzer of the communications protocol proxy monitors or listens for data packets communicated through communications protocol proxy. The packet analyzer analyzes and logs data packets passed back and forth between the wireless device and the wireless communication network. As data streams flow through the communications protocol proxy, a packet analyzer captures data packets and, if needed, decodes the raw data of the data packets, showing the values of various fields in the packet, and analyzes its content.

At 530, data packets are analyzed to determine if a test scenario is applicable. Data packets are identified, and it is determined whether a test scenario is applicable to the type of data packet. If the packet contains specific data, a test scenario may be applied. One or more rules are applied to the data packets to recognize a particular data packet type is being passed between wireless device and wireless communication network.

At 540, the data packets are modified to simulate an error in communication between the wireless device and the wireless communication network. Data packets that pass between the wireless device and the wireless communication network are selectively modified based on test scenarios to simulate different error conditions in a predictable and reproducible way. To simulate errors, a specific a pre-recorded message with a known error may be utilized. In another example, dynamic modification of a packet using a set of prepared rules may be utilized to simulate errors. The dynamic modifications may be simple string replacements, or more complex rules defined using regular expressions. The results and responses of the wireless device and wireless communication network of the simulated errors are captured and communicated to a testing device for further analysis. The analysis utilizes real-time representation of the live wireless communication network and a repeatable test environment to allow the recreation of intermittent network errors and/or intermittent service errors, with minimal impact to the wireless device and network. Further modifications may be made to the wireless communication network and or wireless device based on results of the simulated errors within the network.

The exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, the method comprising:

replacing an address requested by a wireless device from a wireless communication network with an address of a communications protocol proxy;

routing two-way interactive traffic between a wireless device and wireless communication network through the communications protocol proxy using the address of the communications proxy protocol; and simulating error conditions between at least the wireless device and the wireless communication network using the communications protocol proxy.

2. The method of claim 1, wherein the simulating comprises:

intercepting data packets being communicated between the wireless device and the wireless communication network at the communications protocol proxy.

3. The method of claim 2, wherein the simulating further comprises:

analyzing the data packets to determine a test scenario is applicable to the data packets.

4. The method of claim 3, wherein the simulating further comprises:

modifying the data packets to simulate an error in communication between the wireless device and the wireless communication network.

5. The method of claim 4, wherein the simulating further comprises:

modifying packets from multiple wireless devices to simulate errors in the communication between the multiple wireless devices and the wireless communication network.

6. The method of claim 2, wherein the two-way interactive traffic includes Transmission Control Protocol (TCP) channel traffic, and the communications protocol proxy is a WebSocket proxy.

7. The method of claim 6, wherein the wireless communication network is a live cellular network.

8. The method of claim 7, further comprising:

passing phone calls and text messages through the WebSocket proxy such that the traffic passes freely back and forth between the wireless device and the live cellular network.

9. A system, the system comprising:

a processing node communicatively coupled to one or more wireless devices the processing node comprising at least a memory and a processor for performing operations comprising:

replacing an address requested by a wireless device of the one or more wireless devices from a wireless communication network with an address of a communications protocol proxy;

routing two-way interactive traffic between a wireless device and wireless communication network through the communications protocol proxy using the address of the communications protocol proxy; and simulating error conditions between at least the wireless device and the wireless communication network using the communications protocol proxy.

10. The system of claim 9, wherein the simulating comprises:

intercepting data packets being communicated between the wireless device and the wireless communication network at the communications protocol proxy.

11. The system of claim 10, wherein the simulating further comprises:

analyzing the data packets to determine a test scenario is applicable to the data packets.

12. The system of claim 11, wherein the simulating further comprises:

modifying the data packets to simulate an error in communication between the wireless device and the wireless communication network.

13. The system of claim 12, wherein the simulating further comprises:

modifying packets from multiple wireless devices to simulate errors in the communication between the multiple wireless devices and the wireless communication network.

14. The system of claim 10, wherein the two-way interactive traffic includes Transmission Control Protocol (TCP) channel traffic, and the communications protocol proxy is a WebSocket proxy.

15. The system of claim 14, wherein the wireless communication network is a live cellular network.

16. The system of claim 15, further comprising:

passing phone calls and text messages through the communications protocol proxy such that the traffic passes freely back and forth between the wireless device and the live cellular network.

17. A processing node, the processing node comprising a processor and a memory, the memory for storing logic that is executed by the processor to perform operations including:

replacing a WebSocket address requested by a wireless device from a wireless communication network with a WebSocket address of a WebSocket proxy;

intercepting data packets being communicated between a wireless device and a wireless communication network at the WebSocket proxy using the WebSocket address of the WebSocket proxy;

analyzing the data packets, at the WebSocket proxy, to determine a test scenario is applicable to the data packets; and modifying the data packets, at the WebSocket proxy, to simulate an error in communication between the wireless device and the wireless communication network according to the test scenario.

18. The processing node of claim 17, wherein the data packets are two-way interactive TCP channel traffic between the wireless device and the wireless communication network.

19. The processing node of claim 17, wherein the wireless communication network is a live cellular network.

20. The processing node of claim 19, wherein the operations further comprise:

passing phone calls and text messages through the WebSocket proxy such that traffic passes freely back and forth between the wireless device and the live cellular network.

* * * * *